Jan. 26, 1954

J. A. RAJCHMAN 2,667,599

ELECTRONIC SWITCHING DEVICE

Filed March 22, 1951

3 Sheets-Sheet 1

INVENTOR
JAN A. RAJCHMAN
BY Morris A. Rakin
ATTORNEY

Jan. 26, 1954

J. A. RAJCHMAN 2,667,599

ELECTRONIC SWITCHING DEVICE

Filed March 22, 1951

3 Sheets-Sheet 2

INVENTOR
JAN A. RAJCHMAN
BY Morris A. Rabkin
ATTORNEY

Jan. 26, 1954 J. A. RAJCHMAN 2,667,599

ELECTRONIC SWITCHING DEVICE

Filed March 22, 1951

3 Sheets-Sheet 3

INVENTOR
JAN A. RAJCHMAN
BY Morris A. Rabkin
ATTORNEY

Patented Jan. 26, 1954

2,667,599

UNITED STATES PATENT OFFICE 2,667,599

ELECTRONIC SWITCHING DEVICE

Jan A. Rajchman, Princeton, N. J., assignor to Radio Corporation of America, a corporation of Delaware Application March 22, 1951, Serial No. 216,959

20 Claims. (Cl. 315—11)

This invention relates to electronic switching, and more particularly to an improvement in electronic switching devices.

In digital computation, pulse communication, and any other form of digitalized information handling, many switching operations have to be performed at high speed. The problem of switching may be expressed in general form as one which transfers intelligence of the type in which signals are of the "on-off" type, or two cases of a single alternative. A generalized switch can therefore be thought of as a device to which the application of a certain number of input signals correspond unequivocably to a certain number of output signals. Examples of these types of general switches may be found described in Patents Nos. 2,428,811, and 2,428,812, to this applicant, which describe resistance type switching matrices. Similar arrangements are found using crystals instead of resistances. Tubes are used in order to obtain power gain for input to these networks. In such matrix switches the number of input tubes, resistances or crystals and nonlinear intermediary devices, can become surprisingly large for surprisingly small values of input and output. Furthermore, there is quite a high loss of power sustained which is absorbed in the resistances or crystals of the matrices.

It is, of course, possible to obtain a given switching function with far less equipment than is required in any general function switch. However, the difficulty of design of such a circuit increases very rapidly with size, and in a switching function where above four inputs and four outputs are involved, it becomes extremely difficult to find the "most efficient" switching arrangement. Of course any given desired switching function has to be analyzed for itself, so that a possible saving in equipment is obtained only at the expense of engineering time. Furthermore, any change in the logic of the switching requires additional effort.

It is therefore an object of the present invention to provide an improved, general purpose electronic switching device having a plurality of inputs and outputs which may be simply interrelated in any desired manner.

It is another object of the present invention to provide an improved, general purpose electronic switching device requiring fewer components for switching between a plurality of inputs and outputs than heretofore.

It is still another object of the present invention to provide an improved, novel and inexpensive general purpose electronic switching device.

Yet another object of the present invention is to provide an improved general purpose electronic switching device which is more efficient than general purpose switching devices used heretofore.

Another object of the present invention is to provide a novel electronic switching device which is utilizable as a perforated card reading device.

These and other objects of the present invention are attained by providing an electron switching device which essentially comprises a tube envelope having a translucent area and enclosing a semi-transparent photocathode which is positioned at said translucent area. Means are provided to divide the portion of the tube into which the photocathode emits electrons into columns and rows of electron channels. Selecting conductor means are provided for each row of electron channels to select and maintain one row of electron channels open to the passage of electrons and the remaining ones of said rows closed. Electron multipliers are provided for each electron channel and a separate output target is provided for each column of electron channels. A constant, reasonably uniform and strong source of illumination is provided for the photocathode. Between the light source and the photocathode is a light mask which stops the light in all but selected spots. The pattern of perforations in the mask determine which of the electron channels, in a row, which is opened by the selecting means, has photo-emitted electrons therein. The presence or absence of an output voltage on each one of the output targets is determined accordingly. A change in the switching pattern is obtained by changing the pattern of perforations in the light mask. Another embodiment of the invention is shown where, by using a selecting grid providing vertical and horizontal selection, it is possible to select a single electron channel and to maintain said channel open and all other channels closed.

The novel features of the invention, as well as the invention itself, both as to its organization and method of operation, will best be understood from the following description, when read in connection with the accompanying drawings, in which.

Figure 6:
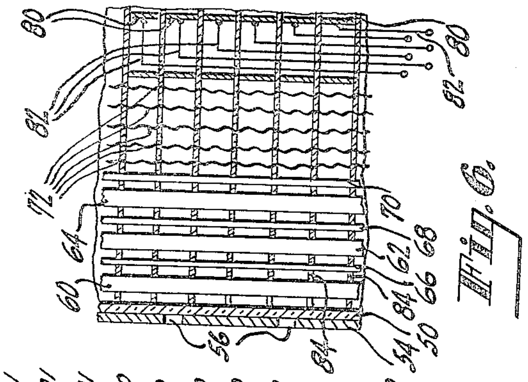
Figure 4:
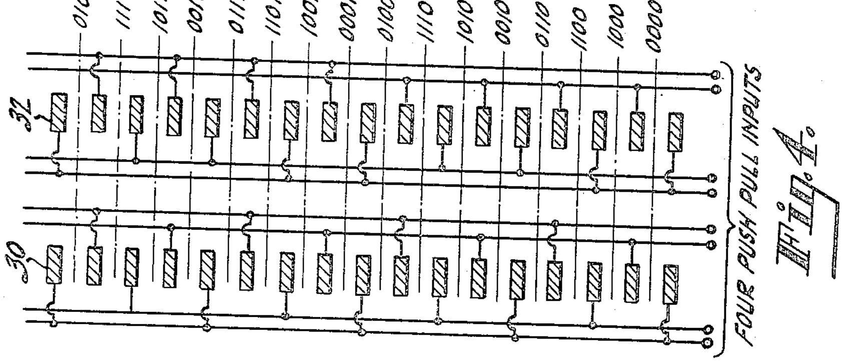
Figures 5, 7, 8:
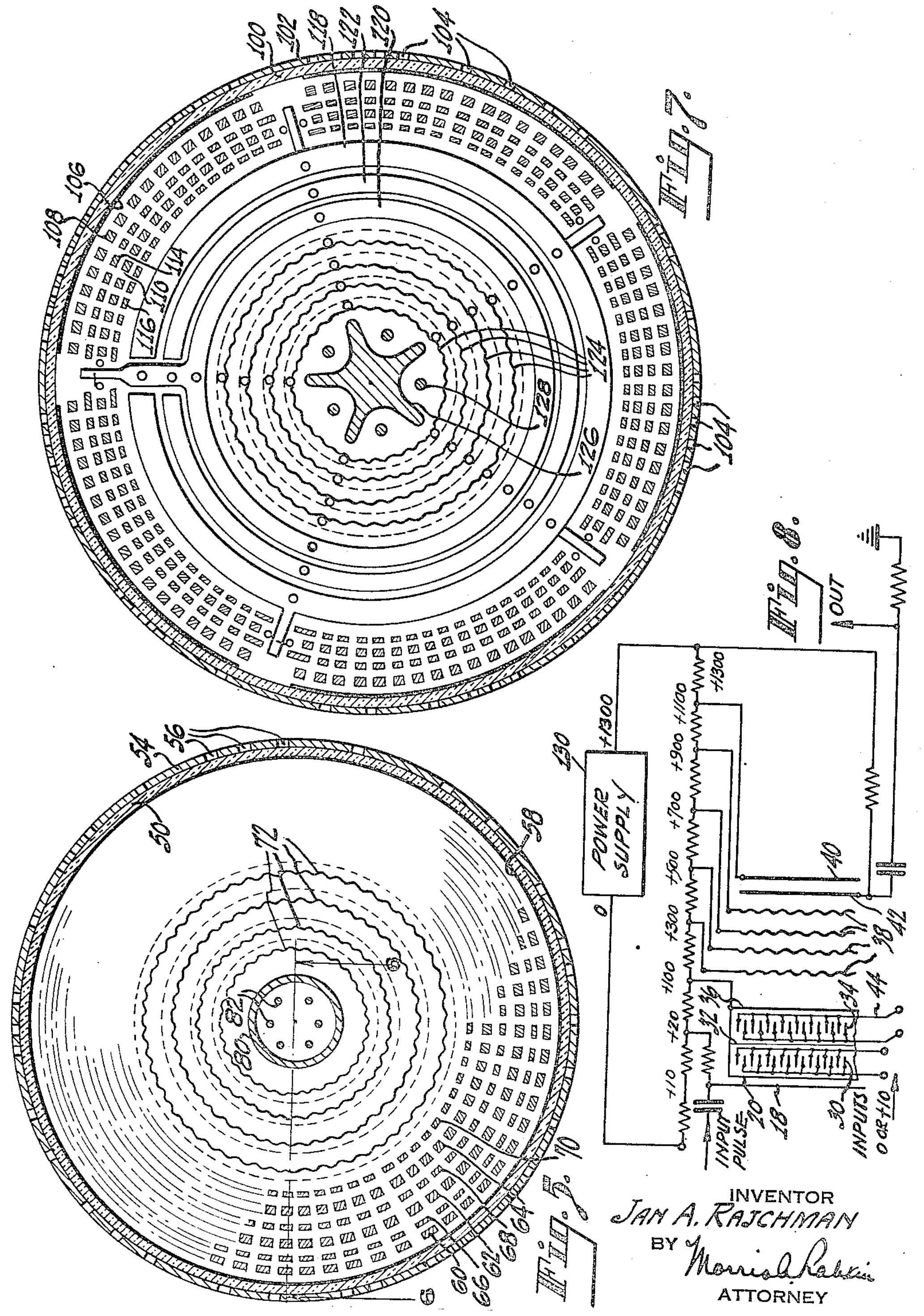

Figure 4 is a schematic diagram of one system of interconnections for the selecting bar grid in the switching tube, Figure 5 is a plan view in section of another embodiment of the invention, Figure 6 is another partial view in section of the embodiment of the invention shown in Figure 5, Figure 7 is a view in section of another embodiment of the invention, and Figure 8 is a schematic drawing showing connections for pulsed operation of the photocathode.

Figure 1:
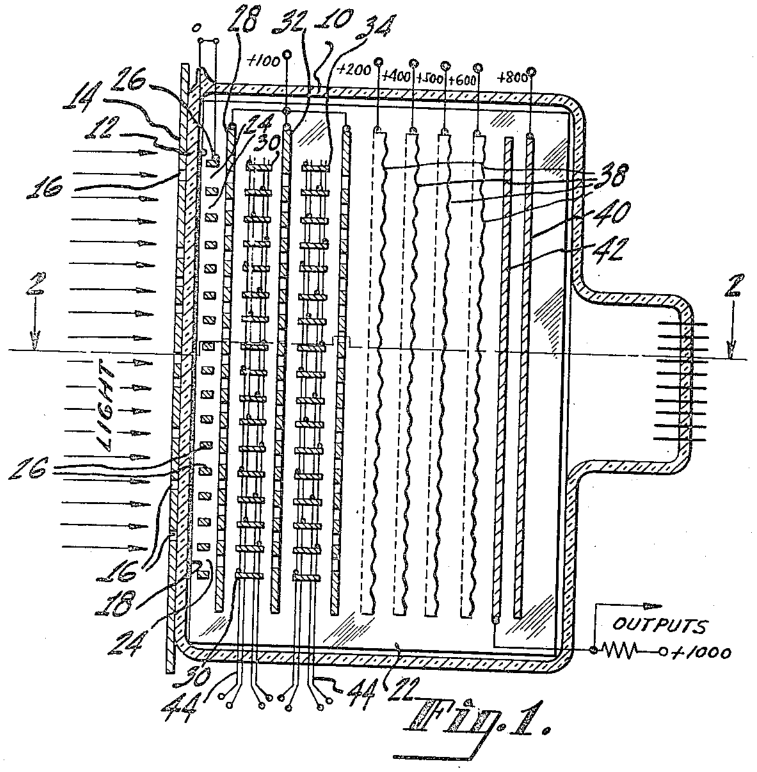
Figure 1 is a cross-sectional view of an embodiment of the invention.
Figure 2:
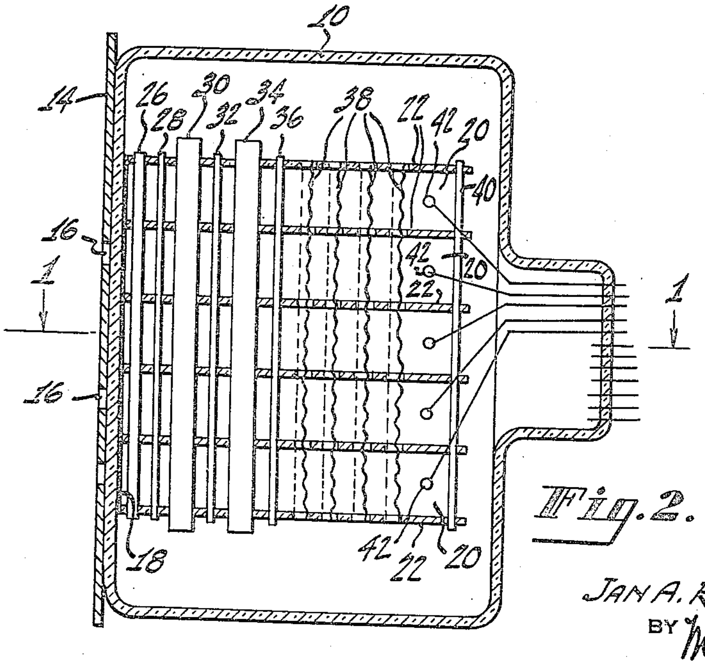
Figure 2 is a plan view in section of Figure 1.

Referring now to Figures 1 and 2, there is shown in cross-section an embodiment of the switching tube. This consists of an evacuated envelope 10 having a plane translucent face 12. A perforated light mask 14 is applied to the tube face. On the inside of the tube face is a semi-transparent photocathode 18. A strong, steady source of light, not shown, shines on the mask and, through perforations 16 therein, onto the photocathode 18. The portion of the tube into which electrons are emitted by the photocathode is divided into electron channel sections 20. The perforations in the mask along one dimension are aligned with these electron channel sections 20. These sections are formed by insulating separating sheets 22 made of a material such as mica. The electron channel sections 20 are divided into electron channel layers 24 by grid structures which extend at right angles to the separating sheets. It may be seen, therefore, that the area of the tube into which electrons are emitted by the photocathode is divided into columns and rows of small electron channels. To further clarify the relationships, it may be stated that the electron channels which are included in an electron channel section correspond to the columns of electron channels and the electron channels which are included in the electron channel layer 24 correspond to rows of electron channels. The layer or row forming grid structure consists of a set of focussing bars 26 adjacent the photocathode to focus any electrons emitted thereon into the rows of electron channels 24 defined by the grid structure. Next is a first accelerating electrode 28. This consists of a metal plate with perforations aligned with each of the electron channels in a row. Adjacent the first accelerating electrode 28 is a first set of selecting bars 30. A second set of selecting bars 34 is positioned adjacent the second accelerating electrode 32, and a third accelerating electrode 36 is positioned adjacent the second set of selecting bars 34. The accelerating electrodes 28, 32, 36 all have the same structure.

In order to amplify any electron current which occurs in an electron channel, there are employed in each of the electron channel rows electron multiplier grids 38. Any of the well known electron multiplier structure may be used for example, a dynode structure such as is described and claimed in my application for an Electron Multiplying and Selecting Electrode Serial No. 118,527, filed September 29, 1949, may be used. Alternatively, the grid-like electron multiplier shown in Patent No. 2,205,207 to Otto Krenzien may be used.

The last dynode 40 in the tube is a flat plate and the secondary electrons from it are collected on the final or target output electrodes 42 which may consist of fine wires. It is to be noted that one of these output electrodes 42 is provided for each of the electron channel sections 20, corresponding to a column of electron channels. Stated otherwise, if the layers of the electron channels as determined by the grid structure are considered as rows and the layers of the electron channels as determined by the mica separating sheets as columns, each column is provided with a target output wire 42. All the grid and target structure in the tube have leads connecting them external to the tube. These leads are brought out through the tube envelope in a manner well known to the art.

The bars in each of the two sets of parallel selecting bars 30, 34 may be individually insulated and have leads brought external to the tube for the application of bias thereto, but it is preferred to interconnect the bars in the manner shown in Figure 4. The interconnecting leads for the purposes of making the drawing more clear are shown at each side of the selecting bars. It may there be seen that with only eight leads brought external to the tube from the interconnected selecting bars and with the application thereto of four push-pull inputs, 16 rows of electron channels may be controlled. An explanation of the theory of operation of the selecting bars will be found in my Patent No. 2,494,670, for an "Electronic Discharge Device," where it is shown that by the application of a proper bias to spaced selecting conductors between which electrons are made to pass, the path of the electrons between all the selecting conductors except for a desired path may be closed. In this manner, by the application of a proper bias to the selecting conductors, all but a selected one of the layers or rows of electron channels are closed to the passage of electrons. The presence or absence of electrons in each of the electron channels in a row, which is maintained open by the selecting bars, is determined by the presence or absence of an opening in the mask which is positioned on the face of the tube. The arrangement and interconnection of the two sets of selecting bars as shown in Figure 4 is shown by way of example. Other numbers of sets of selecting bars may be used, having more or less numbers of bars per set. Furthermore, other interconnections of the sets of selecting bars may be used.

Figure 3:
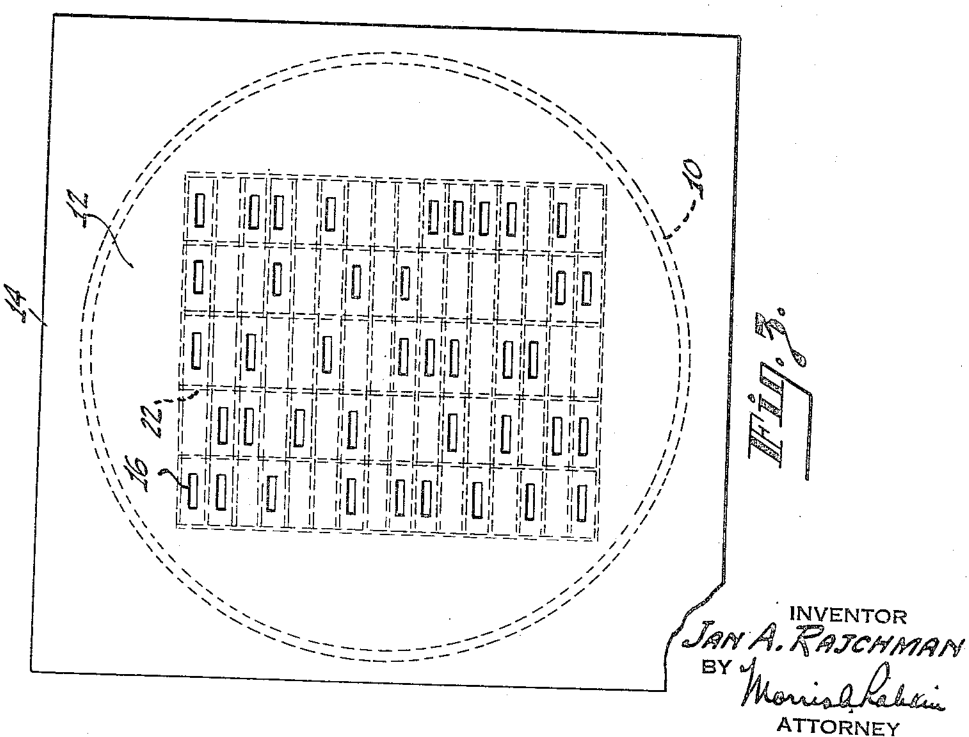
Figure 3 is a drawing of a switching function mask.

In Figure 3 there is shown a mask card 14 of the type suitable for use with the switching tube. To better show the positioning of the card with respect to the tube, tube structure behind the card is shown by dotted lines. The card has perforations 16 in it in accordance with the switching function or code desired for each row of electron channels 24. The card is positioned between a light source and the face 12 of the switching tube so that the perforations are aligned with the electron channels 20 which they are to control. For the card shown, when the first or top electron channel layer is opened to the passage of electrons, if the designation "1" is given to the electron channel having an output and "0" to the channel having none, an output is obtained for the first layer of electron channels which is equivalent to "10111." The second layer of channels provides an output equivalent to "11000." The third layer of channels provides "01101," etc. It may therefore be seen how, by means of the card perforations, a switching pattern or code is determined for a selected row of electron channels. By the relatively simple expedient of using a differently perforated card a change in the switching pattern is obtained. If no change in the switching pattern is contemplated, in place of using the switching mask as a separate card, the switching mask pattern may be stencilled on the face of the switching tube.

This switching device finds utilization not only as a switching device but also as an encoder or decoder for computing machines and the like. A given signal pattern applied to the selecting bars 30, 34 may be encoded in accordance with the mask perforations at the electron channel layer, or row, which is opened. Similarly, a given signal code may be applied to the selecting bars to be decoded in accordance with the mask perforations for the electron channel row which is opened thereby. The tube may also be used for electrically reading cards or paper tapes having a code punched therein. For this purpose, the selecting bars may be connected to counters which would apply signals to the selecting bars so that the layers of electron channels are opened in a desired sequence. The number of rows of electron channels as well as the number of electron channels in each row is not limited to the number shown in the drawings, but may be increased or decreased as required.

The switching capabilities of the tube depend, of course, on the number of possible perforations in the card mask. The level limit of the size of the elements is not determined by the photocurrent available because the electron multiplier gain will make up the desired level of output. The practical limit to the gain of the multiplier is determined by the so-called "ion feedback." With proper design, current gains of $10^5$ to $10^6$ are entirely practical. Therefore, the lower limit to the size of the electron channel in a layer is determined mostly by the mechanical difficulties of making small, control, selecting bars, and by the light interference into a darkened region which results from the illumination of an adjacent region. The latter factor is the most significant one. To reduce this factor, caused by scattering of light in the glass envelope, wall reflection or diffuse outside illumination, several means are employed. These consist of using a reasonably directional light, using a non-reflecting glass surface for the envelope and using a low transmission glass whereby the multipath reflection is attenuated to a greater proportion than a single direct transmission.

Figures 5 and 6 are a cross-sectional view of another embodiment of the invention and its target detail. In this embodiment the tube envelope 50 is cylindrical so that a greater tube area may be used. The light is projected onto the cylinder from all directions and the mask 54 used with the tube is cylindrical to fit over the tube. The photocathode 58 extends around the inside of the tube envelope. Three sets of selecting bars 60, 62, 64 are shown as being used with this embodiment. Three sets of accelerating grids 66, 68, 70 are also shown separating the selecting bars. The selecting bars 60, 62, 64 and accelerating grids 66, 68, 70 are disposed axially and in concentric rings inside the tube envelope 50. This grid structure is only shown part way around the tube. It is to be understood, however, that the grid structure extends in concentric rings completely around the tube. Similarly, these grids are followed by a number of concentric rings of electron multiplier grids 72. The output electrodes are cylindrical targets 80 having leads 82 extending external to the tubes. The tube is divided axially by insulating sheets 84. As before, the insulating sheets 84 divide the tube into large electron channel sections with one target 80 for each electron channel and the grid, including the selecting bars 60, 62, 64 and accelerating electrodes 66, 68, 70 divide the large electron channel sections into layers of electron channels. This embodiment of the invention has 64 selecting bars in each set. These are operated as previously indicated, so that only one desired layer of electron channels, which is disposed axially, is open at a time to the passage of electrons. The selecting bars may be operated to open the layers of the electron channels in a predetermined sequence by connecting them to the outputs of electrical counters.

The number of desired outputs is generally considerably smaller than the number of combinations which can be assumed by the inputs. Therefore, it is advantageous sometimes to utilize one dimension along the mask for the input combinations and share the other dimension between the input combinations and the outputs. This is done in an embodiment of the tube, a cross-section of which is shown in Figure 7. The tube has a cylindrical envelope 100 which is divided radially into five sections or regions which correspond to the five outputs. A mask 102, having perforations 104 to provide the desired switching functions, is fitted around the tube and light is made to shine on the outside of the mask. Each of the five regions has a photocathode 106 at the inner side of the tube envelope followed by two sets of axially extending selecting bars 108, 110 of which there are sixteen in number. Two axially extending accelerating grids 114, 116 are alternated with each of the two sets of selecting bars. Corresponding ones of the axially extending selecting bars 108, 110 in each of the five regions are connected together so that the same angular section is opened in each of these regions simultaneously. For axial selection, all the regions of the tube are divided axially into 16 parts by means of two sets of flat rings 118, 120 with 17 rings in each set. An accelerating electrode ring 122 is positioned between the two sets of flat rings. The selecting bars and flat rings form a selecting grid of the type shown and described in Patent No. 2,494,670 to the applicant. The selecting bars and flat rings essentially define a plurality of rectangular windows through which electrons emitted by the photo-cathode, pass on their way to the target. As explained in the patent, the bias applied to each of the four conductors defining a window determines whether or not electrons may pass through that window. Therefore, by the proper application of bias to the selecting bars 108, 110, an angular selection of a single layer of windows or electron channels is opened to the passage of electrons in each region. By a proper application of bias to the flat rings, which may be called selecting rings 118, 120, an axial selection of a single window or electron channel in the selected layer which is open to the passage of electrons, is made in each region. Whether or not there is a flow of electrons in the selected electron channel in each region depends on whether or not there is a perforation in the mask which is fitted over the tube.

Following the selecting rings, in each region are several electron multiplying grids 124. At the axis of the tube is a star-shaped dynode 126 having fluted sides. This dynode is positioned so that the fluted sides face each of the five regions. A separate output electrode which may be a fine wire is positioned at the plane bisecting the regions of each of the fluted sides and serves as an output electrode for each region. By combinatorial interconnection of the selecting bars as well as the selecting rings in each region, this embodiment of the switching tube, with eight binary inputs (256 combinations) provides five outputs.

While the examples illustrated have a number of combinations which are a power of 4, this is not absolutely necessary. A set of selecting bars may be used to used to divide all the layers of electron channels into two, half the number open and half closed, instead of by fours as in the example illustrated. In this manner only partial advantage of control possibilities is taken. Therefore, a number of combinations equal to a power of two is possible with entire freedom being left to the inputs. For special cases where some combinations of inputs are ruled out because of intrinsic properties of the device in which the switch is used, or the peculiarities of the code, the corresponding gate structures in one tube may be omitted. In that case the number of physical gates may be any number.

The output level of the embodiments of the switching tube is on the order of 1000 to 3000 volts above the input level, in view of the cumulative voltages required for the electron multipliers. This may serve to complicate the coupling of one switching tube to another. Such coupling must be considered because, for any given size switching tube, there will always be bigger switching problems requiring several tubes. Two methods to overcome this high level coupling difficulty suggest themselves. One is a carrier method, the other a pulse method. If a modulating voltage is applied to any electrode in the chain from the photocathode to the output electrode, this modulation will appear in the outputs, if there are outputs. A particularly convenient place to apply the modulating voltage is on the photocathode because a relatively small voltage is required. A higher than signal frequency is used as a modulating voltage and tuned detecting circuits are required in the output.

The "following pulse" method is simpler and particularly adaptable for computing practice. A circuit diagram showing circuit connections for the pulse method is shown in Figure 8. A D. C. power supply 130 provides a voltage to bias the photocathode 18 a few volts positive with reference to the voltage required to be applied to the selecting bars to open an electron channel layer. In the drawing, since such selecting voltage is shown as 10 volts, the photocathode has 20 volts applied to it. This serves to prevent the photocathode from emitting electrons even with light shining on it. The drawing also shows some typical values of the voltages applied to the accelerating grids 28, 32, 36 and electron multiplying dynodes 38. Since, for the purposes of illustration, the tube structure of the embodiment of the invention shown in Figure 1 is used, similar reference numerals as are used in Figure 1 are applied to the similar structures in Figure 8. When switching is desired, in addition to the correct input pulses, a negative pulse is applied to the photocathode from a negative input pulse source to permit it to emit electrons. The resultant pulse output on the output electrode can be coupled through an ordinary coupling condenser to the level of the input. If slow switching time can be tolerated, it is possible to pulse or modulate the light source used with the switching tube to achieve these results.

It should be noted that, with this method of use, current and power are used only for the actual useful pulse time and only in the excited outputs. It is also noteworthy that even with the previously indicated type of usage, since no cathode heater power as well as no anode power are required, the tube is extremely efficient and long lived. The outside light source may be considered a sort of a "replaceable heater."

The subject switching tube also finds use in the reading of the perforations in cards of the type used in modern business. If such a card is used as a tube mask, the unknown pattern of perforations may be very quickly scanned by the tube and well amplified outputs obtained. More than one tube may be used so that while one card is being scanned another is being positioned in front of a tube for scanning. In this manner the scanning may be made continuous.

From the foregoing description, it will be readily apparent that there has been provided an improved, novel, efficient and relatively inexpensive general purpose switching or coding tube. Several embodiments of the present invention have been shown and described, but it should be apparent that changes may be made in these embodiments as well as other embodiments may be made, all of which are still within the spirit and scope of the invention. It is therefore desired that the foregoing description shall be taken as illustrative and not as limiting.

What is claimed is:

1. A switching tube comprising a translucent tube envelope enclosing a photocathode, a selecting grid adjacent said photocathode, electron multiplying means to multiply electrons passing through said grid and target means at the output of said electron multiplying means to collect electrons emitted from said electron multiplying means.

2. A switching tube comprising a tube envelope having a translucent portion and enclosing a photocathode positioned at said translucent portion, a plurality of layers of electron channels into which electrons from said photocathode are emitted, said plurality of layers of electron channels including means to selectively maintain all but a desired one of said layers of electron channels closed to the passage of electrons, and means at the output of said layers of electron channels to collect the electrons passing therethrough.

3. A switching tube comprising a tube envelope having a translucent portion and enclosing a photocathode positioned at said translucent portion, a plurality of layers of electron channels into which electrons from said photocathode are emitted, said plurality of layers of electron channels including means to selectively maintain all but a desired one of said layers of electrons channels closed to the passage of electrons, electron multiplying means in each of said layers of electron channels, and means at the output of each of said electron channels to collect the electrons emitted therefrom.

4. A switching tube as recited in claim 3 wherein said means to selectively maintain all but a desired one of said layers of electron channels closed to the passage of electrons, comprises sets of parallel individual selecting bars, and means interconnecting each of said sets to provide a fewer number of control wires external to said tube than there are selecting wires.

5. A switching tube comprising a tube envelope having a translucent area and enclosing a photocathode positioned at said translucent area, a plurality of layers of electron channels into which electrons from said photocathode are emitted, said layers of electron channels including means to accelerate the electrons emitted from said photocathode through said plurality of layers, sets of individual selecting conductors defining said layers of electron channels, means connecting said selecting conductors external to said tube to permit application of bias to said selecting wires to selectively maintain all but a desired one of said layers of electron channels closed to the passage of electrons, electron multiplying means in each of said layers of electron channels, and means at the output of each of said electron channels to collect the electrons emitted therefrom.

6. A switching tube comprising an envelope having a translucent area and enclosing a photocathode positioned at said translucent area, means to divide the portion of said tube into which electrons are emitted from said photocathode into a plurality of parallel electron channel sections, means to divide said plurality of electron channel sections into layers of electron channels, said means to divide including means to selectively maintain all but a desired one of said layers of electron channels closed to the passage of electrons, electron multiplying means in each of said layers of electron channels, and means at the output of each of said electron channel sections to collect the electrons emitted therefrom.

7. A switching tube as recited in claim 6 wherein said means to divide said tube into a plurality of parallel electron channel sections comprises a plurality of parallel spaced sheets of insulating material.

8. A switching tube as recited in claim 6 wherein said translucent area of said tube envelope has portions thereof opposite predetermined ones of said electron channels rendered opaque to the transmission of light to provide a desired switching pattern.

9. A switching tube comprising a tube envelope having a translucent area and enclosing a photocathode positioned at said translucent area, a plurality of parallel spaced sheets of insulating material positioned to divide the area of said tube into which said photocathode emits electrons into a plurality of electron channel sections, means to divide said electron channel sections into layers of electron channels, said last-named means including means to focus the electrons emitted from said photocathode into said plurality of layers, sets of individual selecting bars defining said layers of electron channels, means connecting said selecting bars external to said tube to apply a bias to said selecting bars to selectively maintain all but a desired one of said layers of electron channels closed to the passage of electrons, electron multiplying means in each of said layers of electron channels, and a separate target means at the output of each of said electron channel sections to collect the electrons emitted therefrom.

10. The combination of a switching tube having a tube envelope with a translucent area with means to allow light to pass only through predetermined portions of the translucent area of said tube envelope, said tube envelope enclosing, a photocathode positioned at said translucent area, means to divide the portion of said tube into which electrons are emitted from said photocathode into a plurality of electron channel sections, means to divide said plurality of electron channels into a plurality of layers of smaller electron channels, said last-named means including selecting bar means to selectively maintain all but a desired one of said layers of electron channels closed to the passage of electrons, electron multiplying means in each of said layers of electrons, and means at the output of each of said electron channel sections to collect the electrons emitted, therefrom, whereby upon light being permitted to shine on said combination, electrons will be only emitted by said photocathode into said electron channels which are opposite areas of said photocathode upon which said means to allow light to pass permits light to fall, and the ones of said electron channels through which said electrons are permitted to pass is determined by the layer of electron channels selected to be open by said selecting bar means.

11. The combination as recited in claim 10 wherein said means to allow light to pass only through predetermined portions of the translucent area of said tube envelope comprises a mask for said switching tube translucent area having perforations therein opposite said predetermined portions in accordance with a desired switching system.

12. The combination as recited in claim 10 wherein said means to allow light to pass only through predetermined portions of the translucent area of said tube envelope comprises an opaque mask painted over all of said translucent area except for said predetermined portions in accordance with a desired switching pattern.

13. A switching tube comprising a substantially cylindrical tube envelope having a translucent area and enclosing a cylindrical photocathode positioned adjacent said translucent area, means to divide the area of said tube into which said photocathode emits electrons into a plurality of electron channel sections, a separate output target for each of said electron channel sections centrally positioned in said tube envelope, grid means adjacent said photocathode to divide all said plurality of electron channel sections into layers of electron channels, said grid means including selecting conductor means to selectively maintain all but a desired one of said layers of electron channels closed to the passage of electrons, and electron multiplying means in each of said electron channel layers positioned between said means to divide said plurality of electron channels into a plurality of layers and said targets.

14. A switching tube as recited in claim 13 wherein said tube envelope has its translucent area covered with opaque paint except for predetermined portions of said area in accordance with a desired switching pattern.

15. A switching tube as recited in claim 13 wherein an opaque mask is fitted to said switching tube envelope, said mask having openings therein at predetermined portions to provide a desired switching pattern.

16. A switching tube comprising a translucent tube envelope divided into sections, each section including within said tube envelope from the outside toward the center in the order named, a photocathode, a selecting grid, said selecting grid affording selection of a single desired path through said grid to be opened to the passage of electrons emitted from said photocathode, electron multiplying means, and an output target to collect electrons emitted from said electron multiplying means.

17. A switching tube as recited in claim 16 wherein each section of said tube envelope is covered with opaque paint except for predetermined portions of said section in accordance with a desired switching pattern.

18. A switching tube as recited in claim 16 wherein an opaque mask is fitted to said switching tube envelope, said mask having openings therein at predetermined portions to provide a desired switching pattern.

19. A switching tube comprising a substantially cylindrical translucent tube envelope divided into sections, each section including within said tube envelope from the outside toward the center in the order named, a photocathode, a selecting grid including a plurality of axially extending flat selecting rings, said selecting grid affording selection of a single desired path through said grid to be opened to the passage of electrons emitted from said photocathode, electron multiplying means, and an output target to collect electrons emitted from said electron multiplying means.

20. A switching tube as recited in claim 19 wherein the similarly located selecting bars of all the selecting grids for every section of the tube are connected together to provide a similarly located open electron path through the selecting grid in each of said sections.

JAN A. RAJCHMAN.

References Cited in the file of this patent

UNITED STATES PATENTS

| Number | Name | Date |
|---|---|---|
| 2,433,700 | Larson ----------- | Dec. 30, 1947 |
| 2,541,374 | Morton ----------- | Feb. 13, 1951 |